July 3, 1934. W. A. BARNES 1,964,805
FOOD CONVEYER CONSTRUCTION
Filed Feb. 13, 1933 2 Sheets-Sheet 1
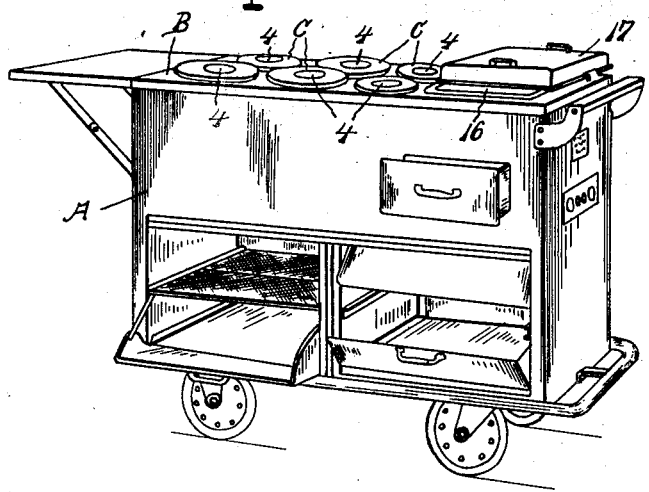
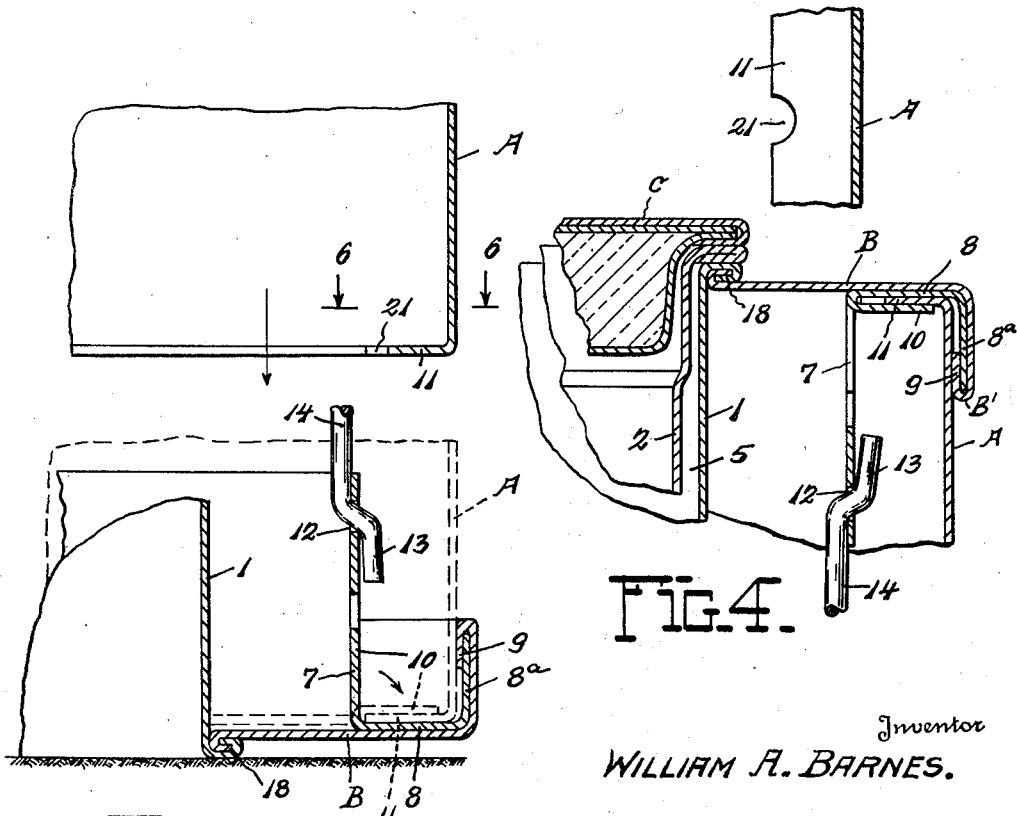
Inventor
WILLIAM A. BARNES.
By Robb+Robb
Attorneys July 3, 1934.  W. A. BARNES  1,964,805
FOOD CONVEYER CONSTRUCTION
Filed Feb. 13, 1933   2 Sheets-Sheet 2

Inventor
WILLIAM A. BARNES.
By
Attorneys

Patented July 3, 1934

1,964,805

UNITED STATES PATENT OFFICE 1,964,805

FOOD CONVEYER CONSTRUCTION

William A. Barnes, Toledo, Ohio, assignor to The Swartzbaugh Manufacturing Company, Toledo, Ohio, a corporation Application February 13, 1933, Serial No. 656,647

6 Claims. (Cl. 126—268)

This invention provides an improved form of portable food conveyers, especially adapted for use in hospitals, cafeterias, and the like, where it is desired to convey food from place to place and maintain the food in heated condition during the transportation thereof.

The invention provides a portable conveyer of this general type which represents a substantial advance over the construction of the prior art in the ease with which it is assembled, and the fact that in the assembly the use of fastening members such as bolts, screws, or the like, is eliminated, and an improved appearance is imparted to the construction.

In general, the conveyer of the present invention is of the type wherein there is employed a casing mounted on wheels or rollers for easy transportation from place to place, which casing is adapted to receive a cover or top deck, the top deck being adapted to receive a plurality of food receiving compartments, as is generally well known in the art. The present invention is concerned primarily, however, in a novel manner of securing the parts together, so that the use of screw or bolt fastening means may be dispensed with, the parts being nevertheless securely interlocked together in their assembled relation. The aim is to do away with the unsightly and ofttimes unsanitary projections made by such fastening means, the same making it difficult to clean the conveyer, something disadvantageous in view of the uses to which it is put. Of greater importance, however, the novel fastening means for the deck, food compartments, and associated parts of this invention, facilitate assembling the apparatus and afford a more rigid or strong structure than usual in this type of equipment.

Where it is desired to maintain the food in heated condition over substantial periods of time, the food retaining compartments are provided with heating units positioned therebeneath, and the invention includes novel instrumentalities for supporting these units, and incidentally the food compartments themselves. The invention further embraces a novel means for simply securing the supporting instrumentalities in position, whereby the heating units and food compartments are firmly carried.

The invention will be more readily understood by reference to the accompanying drawings, in which—

Figure 1 is a perspective view of a food conveyer embracing the principles of the present invention, and indicating the general appearance of the conveyer.

Figure 4 is an enlarged fragmentary sectional view showing the manner of assembling and interlocking the parts of the device.

Figure 5 is a fragmentary sectional view showing the manner in which the casing is secured to the cover or top deck containing the food receiving compartments.

Figure 6 is a fragmentary sectional view on the line 6—6 of Figure 5.

Figure 1 of the drawings shows in a general way a type of equipment to which my invention is especially applied, there being shown a food conveyer of a portable nature in which the casing or body A is mounted upon wheels or rollers to facilitate mobility. The conveyer is positioned at the place where the food which is heated or kept warm therein is to be dispensed. At its top the casing A is equipped with a deck B and from this deck are supported a series of food or other compartments, the closures at the upper ends of which are shown at C.

Figure 3:
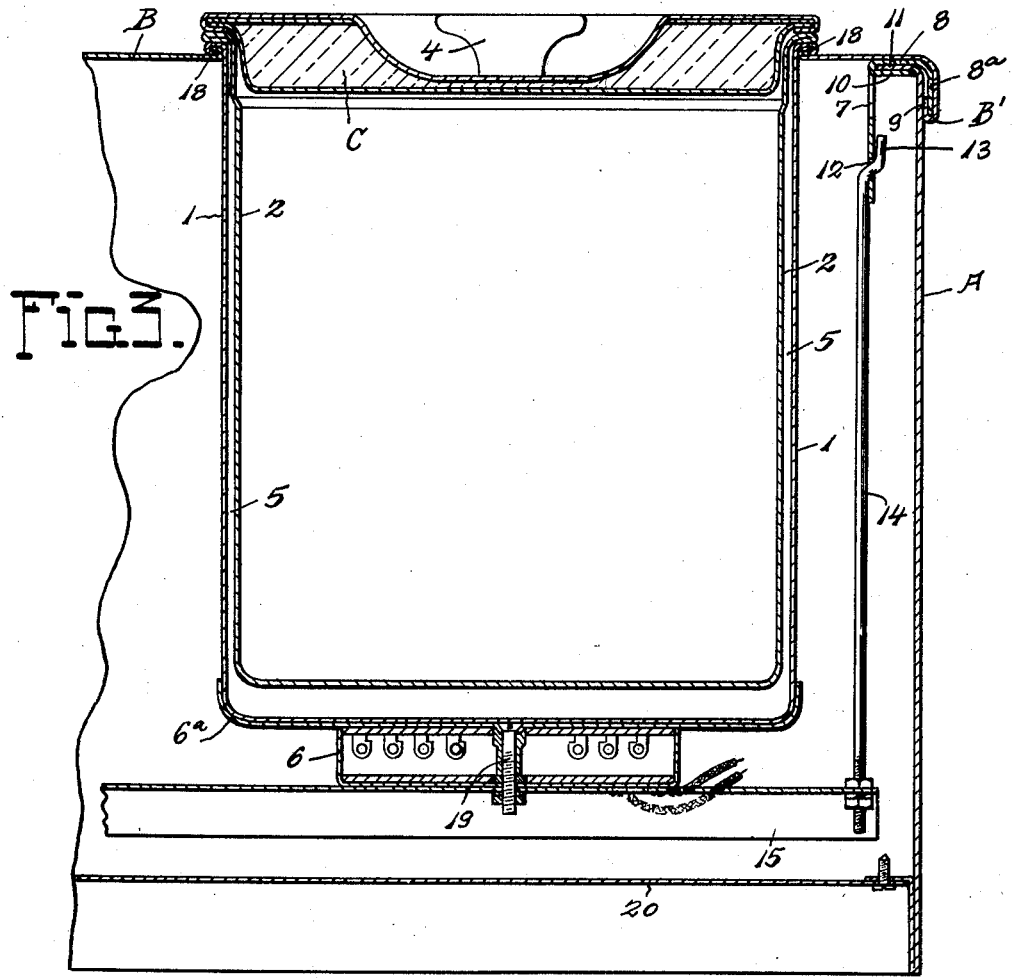
Figure 3 is a fragmentary sectional view through one of the food compartments showing the manner of assembling the parts of the apparatus.
Figure 2:
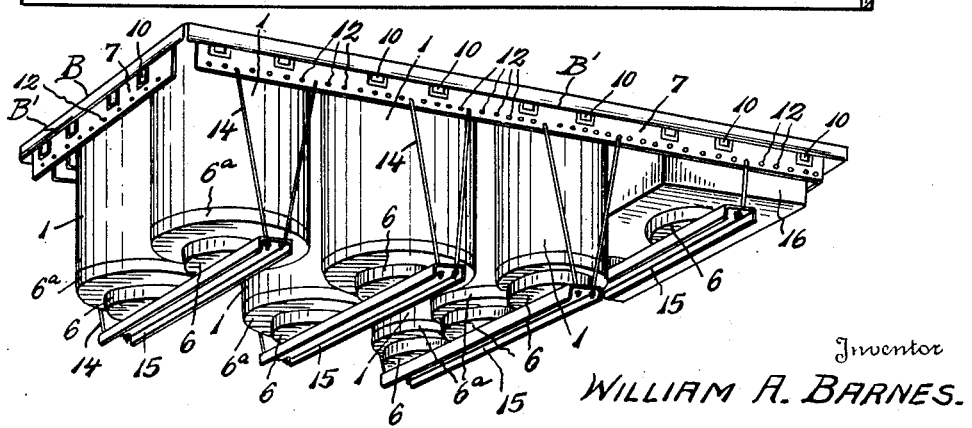
Figure 2 is a perspective view of the cover or top deck of the casing, showing the food compartments assembled therein, showing the supporting instrumentalities for the compartments, and the means whereby these supporting instrumentalities are secured in position.

Whereas heretofore the deck B has generally been attached to the casing A by undesirable fastenings such as projecting screws, bolts, or similar parts, my aim, as previously stated, has been to avoid the use of such kind of fastenings, and therefore the deck construction which I employ affords a smooth edge all around the upper portion of the casing A. The fastening means utilized are entirely invisible and in no way form projections to become dirty or difficult to clean. In Figure 2 there is illustrated the deck assembly, so to speak, and Figure 3 shows more clearly just how the food wells 1 for the food receptacles 2 are supported on the deck. The food wells 1 may be of any suitable shape or size within the purview of the invention, and the food receptacles 2 are adapted to telescope into the wells 1 as clearly shown in Figure 3, and are equipped with the covers or closures C, previously referred to. Knobs or handle 4 are provided for the covers C. Preferably, a space 5 will be left between the food wells 1 and the receptacles 2.

While my invention is not confined to the use of heating elements, still in this class of conveyers, heating means are customarily employed in conjunction with the conveyer equipment, and usually embody electrical heating units adapted to be plugged into sockets connecting with main line current in hospitals, cafeterias, factories, and elsewhere. When heating units are to be associated with the food compartment wells 1, they are provided, as at 6, beneath the bottoms of the compartments and are directly attached to a cupped or dished retainer plate 6a. The deck B, as seen in Figures 2, 3, and 4 principally, is formed with crimped under-flanges B' at its edge portions, the said flanges being designed to engage and support pendant flange plates of peculiar construction embodying the pendant flanges 7 carried by or integral with angle plates 8, which angle plates 8 have their outer vertical portions 8a engaged by a crimped edge 9 on the crimped under-flange B' of the deck B. In this manner the pendant flange plates 7 are secured to the deck, and in order to also secure the parts 7, 8, and 8a to the casing, there are provided struck-out tongues 10 struck from the metal box or pendant flange plate 7 so as to engage with horizontal, inwardly extending flanges 11 on the upper edges of the casing A. The pendant flange plates 7 are seen best perhaps in Figures 2 and 4 and are provided with numerous small apertures 12 through which the upper deflected extremities 13 of the rods or bars 14 are passed. The lower ends of the rods or bars 14 are threaded and provided with nut attaching means engaging opposite sides of cross plates 15, a series of which are employed. In other words, each cross plate, according to the preferred construction shown, extends transversely to engage beneath and support the heating elements of two transversely adjacent food wells 1, or the heating elements of a special food pan or compartment 16, seen in Figure 2, and shown as equipped with a cover 17 in Figure 1. The construction of the parts 14 and 15 braces or supports the food wells 1 at their lower ends, and the upper ends of these wells are united to the deck B by being crimped to crimped flanges of the deck itself as shown at 18, the employment of this crimping connection between the upper ends of the food wells and deck B being well known in the art. The heating elements 6 are held against lateral displacement between the channel plates or supporting bars 15 and the wells 1 by means of a screw bolt 19 and the cup-shaped retaining plate 6a, previously referred to.

It is contemplated to employ the usual bottom closing plate 20 for the bottom of the casing A, the same being attached by suitable fastenings of any desired kind.

Under some conditions where the conveyer equipment is not to be provided with self-contained heating elements the elements 6 would be dispensed with, and in this event, the channel plates or cross bars 15 would preferably directly engage the bottom of the wells 1, or if desired, they may engage the retaining plates 6a.

Referring to Figure 5, there is illustrated a somewhat diagrammatic view to show the mode of assembling the heating elements 6, cross bars 15, rods 14, and associated parts. The parts may be described as having been assembled as shown in Figure 2. Referring to Figure 2, in order to assemble the parts thereof, the various parts illustrated are put together when inverted. If the construction in Figure 2 is turned upside-down, in other words, it will illustrate the arrangement of the deck inverted, and the wells 1 inverted, and the parts 14 and 15 inverted, in which positions they are secured together. Now in order to unite the deck and assembly as shown in Figure 2 with the casing A, the arrangement of the parts in Figure 5 shown only in a fragmentary manner, is resorted to, that is, the deck assembly is inverted as seen at the bottom of Figure 5, and the casing A is bodily turned upside-down from its normal position and lowered so that its inturned flanges 11 may be passed downwardly into the space between the crimped flange B1 and the pendant flange plates 7, which of course project upwardly in the inverted position. This operation is resorted to previous to the bending laterally of the struck-out tongues 10. As soon as the casing A is properly positioned, a long instrument, such as a screw driver, is inserted through the open bottom of the casing and engaged with the tongue portions 10, which are thereupon struck-out so as to engage over the flanges 11 of the casing and thus attach the parts together quickly, firmly, and effectively. To permit the passage of the flanges 11 by the offset ends of the rods 14 that pass through the openings 12, little notches or cut-out portions 21 are provided in the said flanges 11. After the deck assembly is assembled with the casing A in the manner described, the bottom plate 20 may be placed in position to close the bottom of the casing in an obvious manner.

From the foregoing, it will be apparent that a very easy, simple, and quick method of assemblage of the parts of the conveyer device is afforded by the construction proposed.

Having thus described my invention, what I claim as new and desire to secure by Letters Patent of the United States, is—

1. In a food conveyer of the type set forth, in combination, a casing, a deck at the top of the casing having its edges connected with the casing, food wells supported by the deck and projecting downwardly into the casing, cross members associated with the lower portions of the food wells for supporting cooperation therewith, pendant flange plates interlocked with the deck and the casing at the adjoining connected portions thereof, tie rods connecting the said pendant flange plates and the supporting cross members aforesaid, a heating element between the cross members and the bottoms of the food wells, and a cup-shaped retaining plate fastened to each heating element and engaged with the lower end of the well adjacent the said heating element.

2. In a food conveyer of the type set forth, in combination, a casing, a deck for the top portion of the casing, food wells assembled on the said deck, pendant flange plates extending from the deck, supporting means for the lower portions of the wells connected to said flange plates, the casing embodying an inturned flange to fit under the deck and struck-out tongues on said flange plates engaged with the said inturned flange of the casing, and attachment means between the deck and flange plates.

3. A conveyer construction which includes a top deck having a receptacle partially supported therein through engagement therewith, a side wall having an end portion adjoining an end portion of the top deck, means for interlocking with the end portions of the top deck and side wall for forming a non-separable joint, said means comprising a hanger, and means associated with said hanger for additionally supporting said receptacle.

4. A conveyer construction which includes a top deck having a receptacle partially supported thereby through engagement therewith, a side wall adjoining said top deck and having an end portion lying adjacent an end portion of the top deck, and means for interlocking with the end portions of the top deck and side wall for forming a joint thereat, said means comprising a hanger having a part adapted to be moved into engagement with one of the end portions to prevent separation of the parts, and means associated with said hanger for additionally supporting said receptacle.

5. A conveyer construction which includes a top deck having a plurality of receptacles disposed therein and partially supported through engagement therewith, end walls adjoining said top deck, means for producing a joint between the end walls and the top deck for securing the same in non-separable relation, said means comprising a hanger having parts adapted to interlock with said top deck and said side walls, and means associated with the hanger members for additionally supporting said receptacle.

6. A conveyer construction which includes a top deck having a plurality of receptacles partially supported thereby through engagement therewith, end walls adjoining said top deck, hangers having parts for interlocking with said top deck and said end walls, said hangers having a plurality of apertures therein, and means for additionally supporting said receptacles, which includes a cross member spanning substantially the width of the top deck, means for suspending said cross member from said hangers, said means having a part lying in the apertures of the hangers, for support, said cross member being adjustable by shifting said last named means from one aperture to another in said hangers, said cross member supporting the receptacles in the zone of their bases.

WILLIAM A. BARNES.